United States Patent Office 3,578,687
Patented May 11, 1971

---

3,578,687
PROCESS FOR PRODUCING 4-NITROALKANOIC ACIDS
John M. Larkin, Hopewell Junction, and Kenneth L. Kreuz, Fishkill, N.Y., asssignors to Texaco Inc., New York, N.Y.
No Drawing. Filed Jan. 30, 1968, Ser. No. 701,562
Int. Cl. C09f 7/02; C07c 51/28
U.S. Cl. 260—404                               11 Claims

ABSTRACT OF THE DISCLOSURE

A method for preparing a 4-nitroalkanoic acid by contacting a dinitroalcohol having at least 5 carbon atoms corresponding to the formula:

$$R-\underset{\underset{NO_2}{|}}{\overset{\overset{R^1}{|}}{C}}-\underset{\underset{R^3}{|}}{\overset{\overset{R^2}{|}}{C}}-\underset{\underset{R^5}{|}}{\overset{\overset{R^4}{|}}{C}}-\underset{\underset{OH}{|}}{\overset{\overset{H}{|}}{C}}-\underset{\underset{NO_2}{|}}{\overset{\overset{R^6}{|}}{C}}-R^7$$

with an acidic oxidizing agent at a pH not exceeding 4 thereby forming a 4-nitroalkanoic acid of the formula:

$$R-\underset{\underset{NO_2}{|}}{\overset{\overset{R^1}{|}}{C}}-\underset{\underset{R^3}{|}}{\overset{\overset{R^2}{|}}{C}}-\underset{\underset{R^5}{|}}{\overset{\overset{R^4}{|}}{C}}-COOH$$

The contemplated 4-nitroalkanoic acids are useful as plasticizers, bacteriocides, lubricant additives, fuel additives, anti-rust agents and as precursors for the preparation of 2-pyrrolidinone.

---

This invention relates to a process for producing 4-nitroalkanoic acids. In particular, it relates to a novel method for preparing 4-nitroalkanoic acids from dinitroalcohols. This application is a continuation-in-part of copending application Ser. No. 691,145, filed Dec. 18, 1967.

In the past preparation of 4-nitroalkanoic acids has been accomplished by the reaction of acrylic esters with nitroalkanes thereby providing the ester of a 4-nitroalkanoic acid followed by hydrolysis yielding the corresponding acid. Although the above reaction has produced 4-nitroalkanoic acids certain disadvantages were attendant in the method of preparation including the requirement of providing the specific nitroalkane, many of which are costly and difficult to prepare. Moreover, the yields according to this process are relatively low and thereby commercially unattractive.

A method has now been found whereby 4-nitroalkanoic acids can be produced in higher yields and in the substantial absence of by-product formation which permits processing without the necessity of utilizing complicated and expensive purification procedures. Moreover, by the process of this invention more direct and economical routes are set forth for the preparation of substituted and unsubstituted 4-nitroalkanoic acids.

It is therefore an object of this invention to provide a method for the preparation of 4-nitroalkanoic acids.

Another object of this invention is to provide a method for the preparation of 4-nitroalkanoic acids in high yields.

Yet another object of this invention is to provide a method for the preparation of 4-nitroalkanoic acids in the absence of substantial by-product formation.

Other objects and advantages will become apparent from a reading of the following detailed description and examples.

Broadly, this invention contemplates a method of preparing a 4-nitroalkanoic acid which comprises contacting a dinitroalcohol having at least 5 carbon atoms and corresponding to the formula:

$$R-\underset{\underset{NO_2}{|}}{\overset{\overset{R^1}{|}}{C}}-\underset{\underset{R^3}{|}}{\overset{\overset{R^2}{|}}{C}}-\underset{\underset{R^5}{|}}{\overset{\overset{R^4}{|}}{C}}-\underset{\underset{OH}{|}}{\overset{\overset{H}{|}}{C}}-\underset{\underset{NO_2}{|}}{\overset{\overset{R^6}{|}}{C}}-R^7$$

where R is hydrogen or an alkyl group having from 1 to 95, and preferably from 1 to 20 carbon atoms, and where $R^1$, $R^2$, $R^3$, $R^4$, $R^5$, $R^6$ and $R^7$ are hydrogen or alkyl groups having from 1 to 10, preferably from 1 to 6, carbon atoms and where $R^6$ and $R^7$ are most preferably hydrogen, with an acidic oxidizing agent at a pH not exceeding 4 and preferably not above 2 thereby forming a 4-nitroalkanoic acid of the formula:

$$R-\underset{\underset{NO_2}{|}}{\overset{\overset{R^1}{|}}{C}}-\underset{\underset{R^3}{|}}{\overset{\overset{R^2}{|}}{C}}-\underset{\underset{R^5}{|}}{\overset{\overset{R^4}{|}}{C}}-COOH$$

where R, $R^1$, $R^2$, $R^3$, $R^4$ and $R^5$ are as defined above.

According to this invention the contemplated 4-nitroalkanoic acids are derived from dinitroalcohols corresponding to the above formula and include, as starting materials, such alcohols as 1,5-dinitro-2-pentanol,
1,5-dinitro-4-methyl-2-pentanol,
1,5-dinitro-3-methyl-2-pentanol,
1,5-dinitro-2-hexanol,
2,6-dinitro-3-hexanol,
3,7-dinitro-4-octanol,
1,5-dinitro-2-octadecanol,
2,6-dinitro-7-methyl-3-nonanol,
1,5-dinitro-3-methyl-2-dodecanol,
1,5-dinitro-8-ethyl-2-dodecanol,
1,5-dinitro-2-hexadecanol,
1,5-dinitro-3,4,6-trimethyl-2-octadecanol,
2,6-dinitro-3-eicosanol, and
1,5-dinitro-2-docosanol.

Such dinitroalcohols contemplated as starting materials above may be prepared, for example, by contacting substituted and unsubstituted olefins having at least 5 carbon atoms such as 1-pentenes, 1-hexenes, 2-hexenes, 1-octenes, 2-octenes, 3-octenes, 1-octadecenes, 4-nonenes, 1-decenes, 6-eicosenes, etc. with dinitrogen tetroxide and oxygen at a temperature of between —40 and 20° C. to form a nitroalkyl peroxynitrate. The intermediate nitroalkyl peroxynitrate is thereafter contacted with a reducing agent at a temperature of between —20 and 30° C. to form a vicinal nitroalkyl nitrate in accordance with the procedure described in the U.S. Pat. 3,282,983. The vicinal nitroalkyl nitrate so prepared is subsequently converted to the dinitroalcohol by heating the nitrate at a temperature of at least 100° C. thereby thermally rearranging the vicinal nitroalkyl nitrate to a dinitroalcohol in accordance with the procedure described in copending application Ser. No. 686,820 filed Nov. 30, 1967 entitled "Preparation of Dinitroalcohols" by John M. Larkin and assigned to the assignee hereof.

More specifically the process of this invention comprises contacting a dinitroalcohol as hereinabove defined with an aqueous oxidizing agent, employed at a reactor pH not exceeding 4 and preferably not above 2 thereby forming a 4-nitroalkanoic acid.

Illustrative of the contemplated oxidizing agents we mention peroxysulfuric acid, peroxydisulfuric acid, acidified solutions of salts of permanganic acid, chromic acid, and perchloric acid such as potassium permanganate and sulfuric acid, sodium permanganate and sulfuric acid, sodium dichromate and phosphoric acid, potassium dichromate and sulfuric acid, potassium perchlorate and sulfuric acid and sodium perchlorate and phosphoric acid. While the mechanism of this transformation is not clearly known it is believed to proceed first by the oxidation of the dinitroalcohol to a dinitroalkanone which in turn undergoes hydrolytic cleavage to a 4-nitroalkanoic acid.

The reaction temperature employed may vary between about 20 and 150° C. and preferably between 50 and 100° C. Temperatures above 150° C. promote the formation of oxidation products and other undesirable side reactions while temperatures below 20° C. excessively prolong reaction times. The amount of oxidizing agent employed is essentially stoichiometric but practical amounts may range between about 0.9 to 1.1 oxygen equivalents of agent per mole of dinitroalcohol. The reaction time is normally between a few minutes and 24 hours although longer and shorter periods may be employed.

The 4-nitroalkanoic acid prepared above may be recovered, if desired, by standard means as for example by selective distillation and extraction. Illustrative of the 4-nitroalkanoic acids prepared include 4-nitrobutyric acid,
4-nitro-3-methylbutyric acid,
4-nitro-2-methylbutyric acid,
4-nitro-2-ethylbutyric acid,
4-nitro-3,3-dimethylbutyric acid,
4-nitrovaleric acid,
4-nitro-2-methyl-3,3-diethylvaleric acid,
4-nitro-2,4-dimethylhexanoic acid,
4-nitrododecanoic acid,
4-nitroheptadecanoic acid,
4-nitro-2-methylundecanoic acid,
4-nitro-2-ethylundecanoic acid,
4-nitrooctadecanoic acid,
4-nitroeicosanoic acid, and
4-nitrouncosanoic acid.

The 4-nitroalkanoic acid prepared above may be converted to a 2-pyrrolidinone in quantitative yield by hydrogenation in an alcoholic medium in the presence of minor amount of a mineral acid and a hydrogenation catalyst preferably selected from the groups of platinum metals, at temperatures ranging from about 20 to 200° C. preferably from 60 to 120° C., under hydrogen pressures ranging from 1 to 100 atmospheres of hydrogen and preferably between 5 and 40 atmospheres of hydrogen.

In general, conventional and well-known hydrogenation catalysts may be employed including nickel, cobalt, iron and rhenium metals or compounds thereof, supported or unsupported and with or without promoters. Preferably we employ platinum metals catalysts including the light platinum group comprising ruthenium, rhodium and palladium and the heavy platinum group comprising osmium, iridium and platinum. The catalyst may be employed as the respective metal, oxide or salt such as platnium dichloride, palladium dichloride, rhodium oxide, rhodium trichloride, ruthenium trichloride, iridium dichloride, osmium tetrachloride, platinum and palladium. Preferably we employ platinum dichloride and palladium dichloride.

Applicable mineral acids include hydrochloric acid, sulfuric acid, phosphoric acid, nitric acid, and para-toluene sulfonic acid. Preferably we employ hydrochloric acid.

Alcoholic media employed include methanol, ethanol, propanol, isopropanol, butanol, isobutanol, hexanol, octanol, isooctanol and dodecanol. Preferably we employ alcohols having from 1 to 8 carbon atoms.

The amount of mineral acid employed in this reaction may vary from about 0.001 to 0.1 equivalent, preferably 0.01 to 0.05 equivalent of acid per mole of 4-nitroalkanoic acid. The amount of catalyst may vary from about 0.001 to 20 weight percent, preferably 0.1 to 1.0, based on the weight of 4-nitroalkanoic acid. Reaction times of from about 0.25 to 8 hours are customarily employed although longer and shorter periods may be appliicable.

The 2-pyrrolidinone product is thereafter recovered by standard recovery procedures, for example by filtration of the catalyst followed by distillation of the alcoholic medium. Inasmuch as the conversation of the 4-nitroalkanoic acid to the corresponding 2-pyrrolidinone is quantitative the recovered product is of high quality and purity.

The 4-nitroalkanoic acids prepared according to this invention are useful as plasticizers, bactericides, lubricant additives, fuel additives, anti-rust agents and as precursors for 2-pyrrolidinones. Further they are particularly useful as intermediates in the preparation of 1-methyl-2-pyrrolidinone and 1-vinyl-2-pyrrolidinone. Moreover, 2-pyrrolidinone may be based catalyzed to a high molecular weight linear nylon-like polyamide.

In order to more fully illustrate the nature of our invention and manner of practicing the same the following examples are presented.

EXAMPLE I

A gaseous mixture of dinitrogen tetroxide (168 grams) and oxygen in an approximate respective molar ratio of 1:4 was introduced into a solution of 140 grams of 1-pentene in 1190 milliliters of carbon tetrachloride maintained at 10–18° F. during a period of 2¾ hours. Approximately 2 moles (60 grams) of gaseous nitric oxide was added at 10–18° F. The mixture was purged with nitrogen, and the solvent stripped under vacuum at about 35–40° C. 1-nitro-2-pentyl nitrate (286 grams) was thus obtained as a yellow liquid.

A solution of 8.00 grams of 1-nitro-2-pentyl nitrate prepared above was dissolved in 80 milliliters of o-dichlorobenzene under a nitrogen atmosphere. The solution was heated and maintained at a reflux temperature for 19 minutes. The solvent was removed by distillation under reduced pressure (65–70° C. at 15 mm.) and 6.41 grams of 1,5-dinitro-2-pentanol was obtained.

To a mixture of 3.87 grams of 1,5-dinitro-2-pentanol prepared above in a solution of 28 milliliters of concentrated sulfuric acid and 200 milliliters of water, there was added 14.2 grams of potassium permanganate over a period of 15 minutes. The solution temperature rose to 60° C. and a brown precipitate formed. Solid sodium bisulfite was added until the solution became clear and colorless. The solution was cooled to ambient temperature during a period of two hours and subsequently extracted with four 120 milliliter portions of ether. The combined ethereal extracts were dried over anhydrous magnesium sulfate, and the solvent was removed under vacuum at room temperature. The yellow liquid which remained weighed 2.66 grams (92% yield) and was identified by infrared to be 4-nitrobutyric acid.

There is prepared 15.0 grams of 4-nitrobutyric acid by the procedures described above. To a solution of 15.0 grams of 4-nitrobutyric acid and 300 milliliters of methanol there was added 1.0 gram of 10% palladium dichloride supported on carbon and 0.5 milliliter of concentrated hydrochloric acid. This mixture was charged to a reactor, and the reactor pressured to 500 p.s.i. with hydrogen. The reactor was rocked at 200–206° F. for 4 hours.

The solution was thereafter cooled, and the catalyst removed by filtration. The solvent was removed by evaporation under vacuum at about 40° C. A clear liquid weighing 9.52 grams (99.4% yield) was recovered and identified by infrared to be 2-pyrrolidinone.

EXAMPLE II

A solution of 4.2 grams of 1-hexene was dissolved in 55 milliliters of carbon tetrachloride, and the solution was maintained at 0–5° C. while 4.6 grams of dinitrogen tetroxide was introduced in a stream of oxygen (60 ml./min.) during a 6 hour period. The solution was purged with nitrogen, and gaseous nitric oxide was introduced for 22 minutes at the rate of 60.5 milliliters per minute while maintaining the solution at −10 to −15° C. The solution was stirred at −10° C. for an additional 10 minutes, and then allowed to assume ambient temperature. The solvent was removed by evaporation under vacuum at approximately 40° C. There remained 8.49 grams (89% yield) of 1-nitro-2-hexyl nitrate.

A solution of 6.00 grams of 1-nitro-2-hexyl nitrate prepared above in 100 milliliters of o-dichlorobenzene was heated at reflux (176–179° C.) in a nitrogen atmosphere for 1 minute. The solution was cooled and the solvent was distilled at 108–117° C. at 80–85 mm. The brown liquid which remained was chromatographed on 100 grams of silica gel and 4.17 grams of 1,5-dinitro-2-hexanol was obtained.

The 1,5-dinitro-2-hexanol obtained above is added to a 20% solution of sulfuric acid in water, and for each equivalent of 1,5-dinitro-2-hexanol present, there is added 1 equivalent of sodium dichromate. The mixture is heated at 80° C. for 2 hours and thereafter cooled and 4-nitrovaleric acid extracted with ether. The ether is evaporated, and 4-nitrovaleric acid is obtained.

The 4-nitrovaleric acid so obtained is dissolved in ethanol (1 part of 4-nitrovaleric acid per 10 parts of ethanol) and the solution is charged into a hydrogenation reactor to which is added 0.01 part platinum and 0.05 part sulfuric acid per 10 parts of 4-nitrovaleric acid. The mixture is agitated under 20 atmospheres of hydrogen pressure at 120° C. for 6 hours. The catalyst is recovered by filtration and the ethanol is removed by distillation. The product is 5-methyl-2-pyrrolidinone.

EXAMPLE III

A gaseous mixture of dinitrogen tetroxide and oxygen was introduced at 60.5 milliliters per minute into a stirred solution of 6.3 grams of 4-methyl-1-pentene in 55 milliliters of carbon tetrachloride maintained at 0–5° C. The ratio of dinitrogen tetroxide to oxygen was such that 6.9 grams of dinitrogen tetroxide was thus introduced during a 3–4 hour period. The solution was then purged with nitrogen, and nitric oxide was passed into the solution at −10 to −15° C. at 60.5 milliliters per minute for 30 minutes. After the solvent was removed by evaporation at reduced pressure, 12.59 grams (98%) of 1-nitro-4-methyl-2-pentyl nitrate was obtained.

A solution of 2.50 grams of 1-nitro-4-methyl-2-pentyl nitrate prepared above was dissolved in 100 milliliters of a solvent consisting of a linear polymer with a repeating $CF_2$-CFCl unit of 775 average molecular weight. This solution was heated at 180–183° C. for 5 minutes in a nitrogen atmosphere. The solution was allowed to cool, and was extracted with four 40 milliliter portions of methanol. The methanol was evaporated from the combined extract, and the liquid which remained was chromatographed on silica gel. 1.8 gram of 1,5-dinitro-4-methyl-2-pentanol was obtained and identified by infrared.

The 1,5-dinitro-4-methyl-2-pentanol obtained above is added to a 50% solution of phosphoric acid in water, and for each equivalent of 1,5-dinitro-4-methyl-2-pentanol present, there is added 1 equivalent of sodium perchlorate. The mixture is heated at 60° C. for 4 hours, and thereafter cooled. 3-methyl-4-nitrobutyric acid is extracted from the mixture with ether and the ether thereafter separated by evaporation.

EXAMPLE IV

A solution of 12.6 grams of 1-octadecene in 55 milliliters of carbon tetrachloride was maintained at 0° C. while a gaseous mixture of 4.6 grams of dinitrogen tetroxide and oxygen was introduced at 60.5 milliliters per minute during a 3–4 hour period. The solution was purged with nitrogen, and cooled to −5° C. Nitric oxide was then introduced at the rate of 60.5 milliliters per minute for 22 minutes while the solution was maintained at 0 to −5° C. The dark green solution was allowed to warm to ambient temperature, and the solvent was removed by evaporation under reduced pressure at 30° C. The recovered liquid, 17.89 grams, was indicated by infrared to be 1-nitro-2-octadecyl nitrate.

A solution of 16 grams of 1-nitro-2-octadecyl nitrate prepared above is dissolved in 150 milliliters of orthodichlorobenzene, and is heated at reflux in a nitrogen atmosphere for 25 minutes. The solvent is removed by vacuum distillation, and there is obtained 12.8 grams of 1,5-dinitro-2-octadecanol.

The 1,5-dinitro-2-octadecanol prepared above is dissolved in 200 milliliters of a solution consisting of 80 milliliters of concentrated sulfuric acid and 120 milliliters of water. There is added 10 grams of potassium perchlorate, and the mixture is heated at 50° C. for 4 hours. Excess perchlorate is destroyed by the addition of sodium bisulfite, and the mixture is extracted with ether. The ether is removed by evaporation, and 10 grams 4-nitroheptadecanoic acid is recovered.

The 4-nitroheptadecanoic obtained above is esterified by heating with ethyl alcohol and sulfuric acid. There is obtained ethyl-4-nitroheptadecanoate which is useful as a plasticizer for polyvinyl chloride.

We claim:
1. A method of preparing a 4-nitroalkanoic acid which comprises contacting a dinitroalcohol corresponding to the formula:

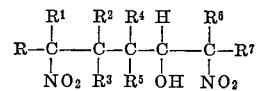

where R is hydrogen or an alkyl group having from 1 to 20 carbon atoms, where $R^1$, $R^2$, $R^3$, $R^4$, $R^5$, $R^6$ and $R^7$ are hydrogen or alkyl groups having from 1 to 6 carbon atoms with an acidic oxidizing agent at a pH not exceeding 4, wherein said oxidizing agent is present in an amount of about 0.9 to 1.1 oxygen equivalent of agent per mole of said dinitroalcohol, wherein said contacting is conducted at a temperature of from 20 to 150° C., thereby forming a 4-nitroalkanoic acid of the formula:

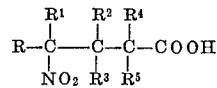

where R, $R^1$, $R^2$, $R^3$, $R^4$ and $R^5$ are as defined above.

2. A method according to claim 1 wherein said acidic oxidizing agent is an acidified solution of potassium permanganate acidified with sulfuric acid.
3. A method according to claim 1 wherein said acidic oxidizing agent is an acidified solution of sodium dichromate acidified with sulfuric acid.
4. A method according to claim 1 wherein said acidic oxidizing agent is an acidified solution of sodium perchlorate acidified with phosphoric acid.
5. A method according to claim 1 wherein said acidic oxidizing agent is an acidified solution of potassium perchlorate acidified with sulfuric acid.
6. A method according to claim 1 wherein said acidic oxidizing agent is peroxysulfuric acid.
7. A method according to claim 1 wherein said 4-nitroalkanoic acid is 4-nitrobutyric acid.
8. A method according to claim 1 wherein said 4-nitroalkanoic acid is 4-nitrovaleric acid.
9. A method according to claim 1 wherein said 4-nitroalkanoic acid is 3-methyl-4-nitrobutyric acid.
10. A method according to claim 1 wherein said 4-nitroalkanoic acid is 4-nitroheptadecanoic acid.

11. A method of preparing a 4-nitroalkanoic acid which comprises contacting a dinitroalcohol corresponding to the formula:

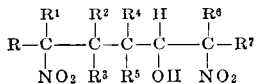

where R is hydrogen or an alkyl group having from 1 to 20 carbon atoms, where $R^1$, $R^2$, $R^3$, $R^4$, $R^5$, $R^6$ and $R^7$ are hydrogen or alkyl groups having from 1 to 6 carbon atoms with an acidic oxidizing agent comprising an acidified solution of potassium permanganate acidified with sulfuric acid at a pH not exceeding 2, wherein said oxidizing agent is present in an amount of about 0.9 to 1.1 oxygen equivalent of agent per mole of said dinitroalcohol, wherein said contacting is conducted at a temperature of from 50 to 100° C. thereby forming a 4-nitroalkanoic acid of the formula:

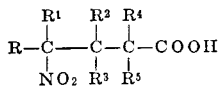

where R, $R^1$, $R^2$, $R^3$, $R^4$ and $R^5$ are as defined above.

References Cited

UNITED STATES PATENTS

| | | | |
|---|---|---|---|
| 2,267,377 | 12/1941 | Olin et al. | 260—687 |
| 2,475,996 | 7/1949 | Smith | 260—632 |
| 2,500,599 | 3/1950 | Bergsteinsson et al. | 260—536 |
| 2,616,923 | 11/1952 | Plaut | 260—536 |
| 2,849,484 | 8/1958 | Clingman, Jr. | 260—687 |
| 3,192,258 | 6/1965 | Nakagawa et al. | 260—687 |
| 3,325,507 | 6/1967 | Kollonitsch | 260—687 |

OTHER REFERENCES

Robertson, "n-Butyl n-Butyrate 1951," Org. Syn. Gilman & Blatt. 2nd ed., QD 262 072, pp. 138–140 (1951).

Badische Anilin, "Aliphatic Nitrocarboxylic Acids" (1952), CA52, p. 5455 (1958).

Westfahl, "An Abnormal Hydrolysis of γ-Nitro, γ,γ-Disubstituted Butyric Acid Des." (1958), CA53, p. 212 (1959).

Societé Saargruben A.G., "Nitrated Fatty Acids" (1952), CA51, p. 7744 (1957).

LEWIS GOTTS, Primary Examiner

G. HOLLRAH, Assistant Examiner

U.S. Cl. X.R.

260—31.2, 326.8, 531, 632, 999; 424—317; 44—70, 72; 252—51.5, 56, 392, 394